United States Patent [19]

Fletcher et al.

[11] 3,875,584

[45] Apr. 1, 1975

[54] TELEVISION NOISE REDUCTION DEVICE

[76] Inventors: James C. Fletcher, Administrator of the National Aeronautics and Space Administration in respect to an invention of; Bernard L. Gordon, Houston, Tex.; James C. Stamps, La Porte, Tex.

[22] Filed: Oct. 17, 1973

[21] Appl. No.: 407,323

[52] U.S. Cl. .......................... 358/36, 178/DIG. 12
[51] Int. Cl. .......................................... H04n 9/00
[58] Field of Search ........ 178/5.2 R, 5.4 R, 5.4 CD, 178/6, 6.8, 7.1, DIG. 12; 358/36, 37

[56] References Cited

UNITED STATES PATENTS 3,555,180 1/1971 Cook .................................. 178/7.1

OTHER PUBLICATIONS

RCA Technical Note, No. 494, Sept., 1961.

*Primary Examiner*—Robert L. Richardson
*Attorney, Agent, or Firm*—Marvin J. Marnock; Marvin F. Matthews; John R. Manning

[57] ABSTRACT

The noise reduction system of this invention divides the color video signal into its luminance and chrominance components. The luminance component of a given frame is summed with the luminance component of at least one preceding frame which was stored on a disc recorder. The summation is carried out so as to achieve a signal amplitude equivalent to that of the original signal. The averaged luminance signal is then recombined with the chrominance signal to achieve a noise-reduced television signal.

3 Claims, 2 Drawing Figures

TELEVISION NOISE REDUCTION DEVICE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 45 U.S.C. 2457).

BACKGROUND OF THE INVENTION

A video television signal is analog, usually one-volt peak-to-peak, with a bandwidth of 4.25 MHZ maximum for standard broadcast television. One television picture consists of 525 lines of video, not all of which are active. The picture is "painted" on a cathode-ray tube, one line at a time. This is accomplished by an electron beam sweeping back and forth across the face of the tube during which time the brightness or intensity of the beam is modulated according to the signal or information (scene) content which it is desired to reproduce. Starting in the upper left hand corner of the tube, the beam scans horizontally from left to right. When the beam reaches the extreme right hand side of the tube it is extinguished and quickly retraced to the left hand side of the tube in order to begin line 2 of the picture. As the beam is scanning left to right, it is also being deflected vertically from top to bottom; however, during one horizontal scan of the tube, the vertical deflection is very small, in order that one-half of the picture, or 262 ½ lines will be scanned during one vertical excursion of the beam. Upon reaching the bottom of the screen, the beam is extinguished for a longer period of time, usually about 19 horizontal line times, in order that the vertical retrace may be accomplished with the beam being off during that time.

The second half of the complete television picture is then "written" on the face of the cathode ray tube in the same manner as the first half, with the second half scan lines being positioned in between the scan lines of the first half.

The reasons for scanning the picture in two halves are as follows: The eye cannot see the scanning beam moving back and forth across the tube, as the action takes place much too fast for the eye to follow. The eye retains the image as a whole, and the tube in fact retains the image, allowing it to fade only in time for the next picture to be presented. There are 30 complete pictures being presented during 1 second, or 60 "half-pictures." The complete picture consists of 525 lines of video as previously discussed, and each "half-picture" consists of 262 ½ lines. The picture might have been presented in its entirety, thereby scanning the tube vertically 30 times each second; however, at the brightness and contrast levels usually employed for reproducing a television picture, 30 pictures per second would appear to flicker to the viewer. If the picture is presented one-half at a time as discussed above, scanning one-half of the picture and then going back and scanning the second half, the effective rate of picture presentation is therefore 60 half-pictures per second. The flicker rate is now 60 per second, which is too fast a flicker rate for the eye to see as a flicker. The image retention properties of the eye blend this rate into a smooth motion. For this reason, the television picture is transmitted to the home viewer at a rate of 60 half-pictures or "fields" per second, which is really 30 complete pictures or "frames" per second.

It can be seen from the above that 60 fields are presented each second, or 30 frames. As each frame consists of 525 lines, there are 30 × 525 or 15,750 lines being presented each second.

It is the nature of television signals to be periodic. Any two successive scenes must be very much alike in order for the eye to preserve continuity, and in fact if no motion is present in the transmitted picture, every picture will be a reproduction of the one that immediately precedes it. Therefore, if little or no motion is involved there will be a succession of nearly identical pictures being presented.

While television signals are periodic, noise, on the other hand, is aperiodic or random. The present invention makes use of the periodic nature of the television signals and of the aperiodic nature of the noise to cancel or at least greatly reduce the amount of noise which may be contained in video signals derived from noisy environments such as, but not limited to, spacecraft missions.

In the prior art, attempts have also been made to reduce the noise contents of video signals but by filtering methods which had the effect of reducing not only noise but the sharpness of the viewed pictures as well, thereby causing loss of resolution.

Accordingly, it is a general object of the present invention to improve the video signals having low signal-to-noise ratios such as video signals derived from manned spacecraft missions whether from lunar surface or from orbital flights. By increasing the signal-to-noise ratio there is obtained a more pleasing picture with less objectionable interference to viewing.

While this invention will be described with reference to color television, the invention will find application to black and white television as well.

SUMMARY OF THE INVENTION

The incoming video signal is separated into its luminance and chrominance components. The luminance component is applied to the input of a disc recorder and also to the input of a summing amplifier. Each luminance component is stored on the video disc recorder which typically revolves at a speed of 3,600 RPM thereby completely one revolution every sixtieth of a second. Each channel of the disc recorder contains two tracks so that one frame can be stored in each channel, or one field per track. Each frame after being recorded is available for immediate replay. With a four-channel recorder, the number of available recorded frames from the recorder to the summing amplifier is three. Hence, the maximum number of frames that can be added is four.

By weighted summing of at least two identical or nearly identical frames there is obtained an average frame identical or nearly identical to either of the two frames, but their noise becomes considerably reduced, thereby obtaining an improvement in the signal-to-noise ratio.

By extending the summation to more than two frames, a greater signal-to-noise ratio improvement can be achieved. When the frames being added contain motion, there is an optimum number of frames that should be summed to avoid blurring of the moving object.

The averaged luminance component is then recombined with the chrominance component and then suitably processed to achieve a noise-reduced NTSC television signal.

DESCRIPTION OF THE PREFERRED EMBODIMENT

Figure 1:
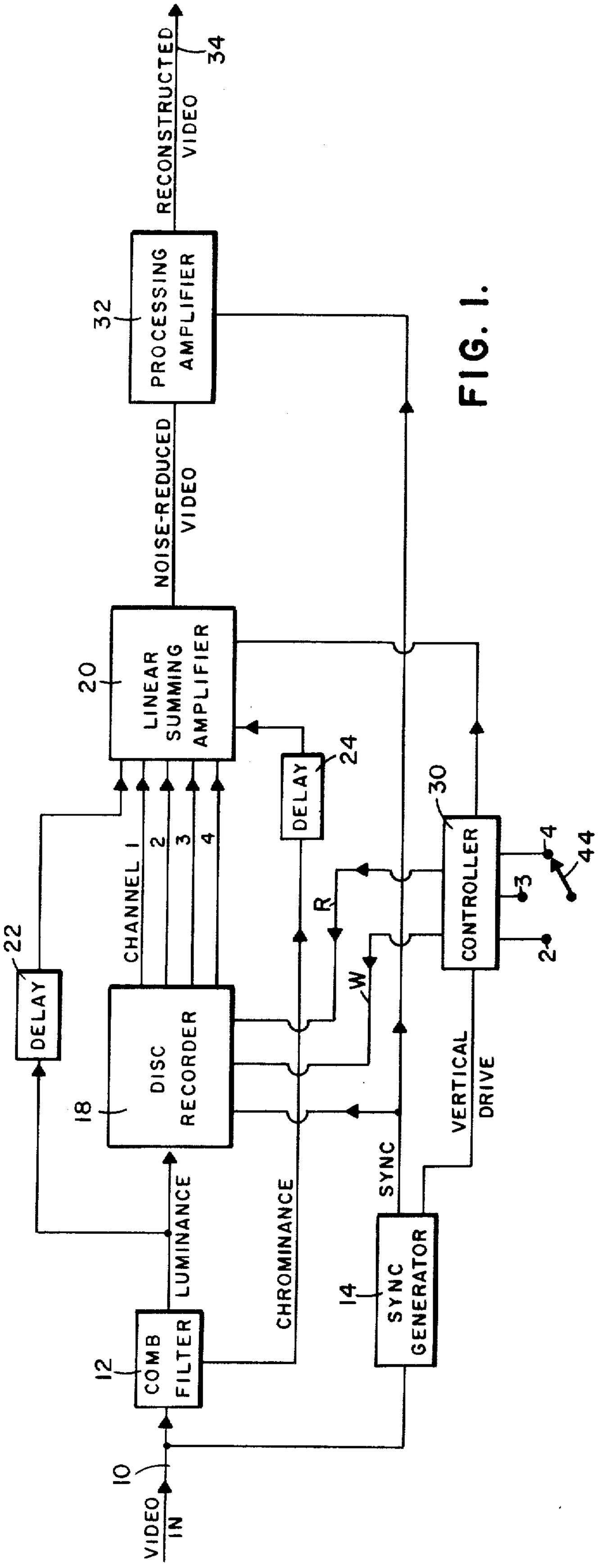
FIG. 1 is a block diagram representation of the preferred embodiment of the noise reducing system of the present invention.

The video input signal arriving on line 10 is applied to a comb filter 12 and to a sync generator 14. Comb filter 12 separates the luminance and chrominance components from the input video signal. The sync generator 14 strips the synchronizing signals from the video input and generates its own synchronizing signals which are applied to the recorder 18 for control of its servo mechanism (not shown). The luminance component is applied to the input of a conventional television disc recorder 18 as well as directly to one input of a linear summing amplifier 20.

The disc recorder 18 employed includes four channels for recording one frame per channel. The disc recorder records the luminance components of the video signal using a revolving disc as a storage medium. The disc in this instance revolves at a speed of 3,600 RPM thereby completing one revolution every sixtieth of a second. A frame is stored on two tracks, one field per track, and is available for immediate replay. The recording heads (not shown) are fixed relative to the revolving disc and are also used for replay. While a disc recorder is shown, any storage medium could be employed provided that it can store video one frame at a time and each frame must be available for instant playback subsequent to recording.

The summing amplifier 20 therefore separately receives the luminance component directly from the comb filter 12 through a delay line 22 and the output from each channel of the disc recorder 18. The chrominance component is also applied through a delay line 24 to the summing amplifier.

A controller 30 obtains its references from the sync generator 14 and generates (1) the necessary logic disc control commands to the disc recorder 18, and (2) the weighting commands to the summing amplifier 20.

The noise-reduced video output from the summing amplifier 20 is processed by a standard television processing amplifier 32. The processing amplifier restores to the averaged signal from the summing amplifier 20 the synchronization signals from the sync generator 14 and the 3.58 MHZ subcarrier. Thus the output on output line 34 from processing amplifier 32 is essentially a duplication of the input video signal on line 10 except that noise is effectively reduced but at the expense of slight motion blur in the case of considerable motion in the frames being averaged.

OPERATION OF THE PREFERRED EMBODIMENT

In operation, the luminance component is consecutively stored in the video disc recorder, one field per track or one frame per channel. The chrominance component of the video signal is preferably not stored in the disc recorder because the chrominance component is encoded and is time-base sensitive. A recording medium does not completely preserve the time-base stability of the signal being recorded, and time base correction circuitry would have to be employed at the output of the recorder in order to restore the lost time base stability. Such time-base correcting circuitry is complex and costly and its use is not justified. The chrominance component also reverses phase every other frame, and if it were not separated from the luminance component, the present system would not preserve it.

The luminance component is recorded sequentially first on Channel 1 and then on Channels 2, 3, and 4. Upon completion of recording on Channel 4, the signal is again recorded on Channel 1 and the sequence is repeated. The recorded signal is available at any time from any channel other than the one being recorded upon.

The summing amplifier sums the inputs applied thereto so that the luminance component of a given frame is selectively added to the luminance components of one, two, or three preceding frames which have been stored on the disc recorder. The sum is averaged to achieve a signal amplitude equivalent to that of the original signal. This averaged luminance component is then recombined by the summing amplifier with the chrominance component to achieve a noise-reduced video signal. Finally the processing amplifier 32 restores the synchronization signals and the reference 3.58 MHZ subcarrier.

The selection of the number of frames to average is based on the following considerations:

Whenever little or no motion is present in the television signal, as has previously been explained, the television signal is a succession of identical or nearly identical signals. If, in fact, there is no motion, the signals are identical in information content and only the amount of noise in each will differ. If two of these identical signals are summed, the result is a signal identical to either of the two, but at twice the magnitude. However, if two random noise signals are summed, each being equal in magnitude, the sum is a random noise signal with an amplitude of 1.4 times either of the input magnitudes.

If the summation for two frames is weighted to preserve the original magnitudes of the information contents of the individual input signals, there will result a three DB improvement in the signal-to-noise ratio, peak-to-peak video to RMS noise.

Extending this reasoning to the summation of four frames would result in a six DB signal-to-noise ratio improvement.

The summing amplifier 20 in response to the weighting commands performs the above summations and recombines the chrominance signal at its proper level.

The controller 30 generates the necessary logic commands to the disc recorder 18. These commands enable the disc recorder to record each incoming frame on the proper track, and to replay the recorded signals in their proper sequences. A control panel (not shown) on the controller contains an operator-selected switch 44 which enables the system to sum either two, three, or four frames of video. It was empirically determined that summing beyond four frames added noticeable motion distortion to the signal.

Motion distortion of the signal is caused by the fact that if there is motion in the television picture transmitted, any two consecutive frames are not identical. They differ only in that portion where motion is involved. The effect of summing and averaging two or more frames which contain motion is to blur the moving object. This effect is not detrimental where a low number of frames is averaged, i.e., two; but where considerable motion is involved a large number of frames cannot be averaged without this motion blur becoming objectionable. The operator must monitor the television signal being processed and select the maximum number of frames to be averaged without objectionable blur.

The controller 30 gates the proper number and selection of television frame outputs from the disc recorder 18 to the summing amplifier 20. The controller also controls the gains of the summing amplifier, which are the weighting factors previously described.

The video output from the summing amplifier 20 is processed by the standard processing amplifier 32. The function of the processing amplifier is to replace the reference synchronizing portions of the television signals, and to restore the proper levels to the television signals if any abnormalities occur in the system.

The output of the processing amplifier on line 34 is essentially a duplication of the input video signal on line 10 with the exception that noise is effectively reduced at the slight expense of motion blur. Where motion blur is not objectionable, the system greatly improves the technical qualities of television signals.

Figure 2:
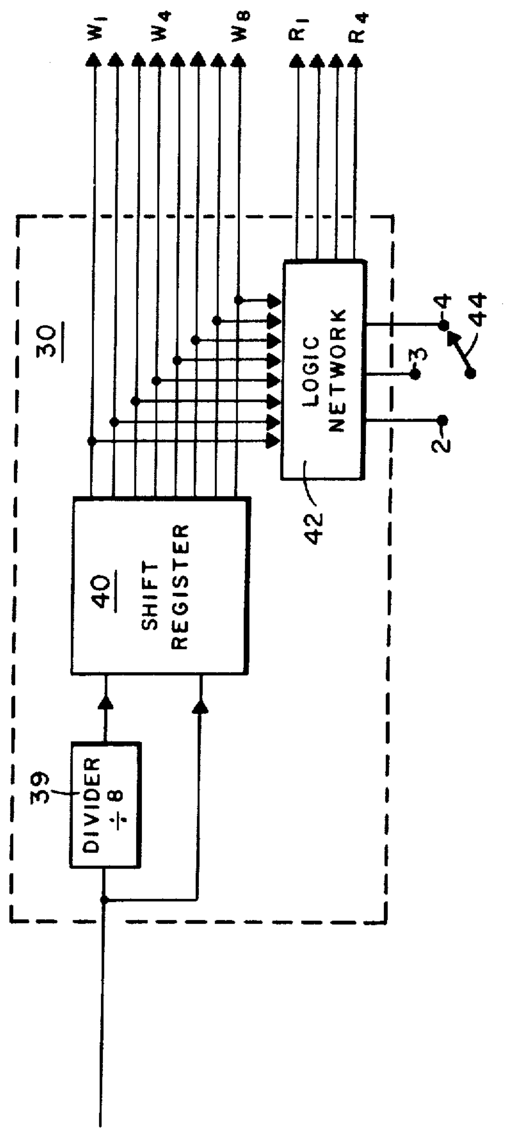
FIG. 2 is a schematic block diagram of the controller shown in FIG. 1.

Referring now more particularly to FIG. 2, the vertical drive from the sync generator 14 is used as a reference for all switching operations since the vertical drive occurs during the inactive portion of a television picture and any switching transients would be suppressed by the output processing amplifier 32.

As previously discussed, a video frame consists of two fields, arbitrarily named "odd" and "even" fields. Vertical drive occurs at the beginning of each field. The vertical drive is divided by eight in a divider 39 and fed to a shift register 40. The undivided vertical drive is also directly applied to the shift register to serve as a clock. The shift register 40 provides output pulses to eight lines 41 which sequentially receive pulses $W_1$–$W_8$.

Each such pulse has a duration equal to the period of the vertical drive; that is, the duration of each such pulse is equal to one field.

The first pulse $W_1$ is used to initiate recording by head one of the disc 18, and is also used to erase head two. The next pulse $W_2$ is used to record on head two and to erase head three, and so on. The $W_1$, $W_3$, $W_5$ and $W_7$ pulses occur during the odd field times, and $W_2$, $W_4$, $W_6$ and $W_8$ pulses occur during the even field times. The sequence is repeated, with pulse $W_1$ following pulse $W_8$, and thereafter remains the same.

The output pulses $W_1$–$W_8$ from the shift register 40 are also applied to a logic network 42 for producing four replay pulses $R_1$–$R_4$. Network 42 is controlled by a manually-operated switch 44 having three positions marked "2," "3," and "4." The position of the switch will depend on the number of frames desired to be summed. The outputs from the logic network 42 are four replay command pulses $R_1$–$R_4$ which are also fed to the disc recorder 18.

In more detailed description of the operation of controller 30, heads one and two of recorder 18 are arbitrarily selected to record frame one; heads three and four will record frame two; heads five and six will record frame three; and heads seven and eight will record frame four. All recorded video is used to sum with the original or incoming video in the summing amplifier 20.

Accordingly, each recorded frame is available for replay three frames out of four. The fourth frame period is that period during which the frame is being updated or re-recorded. During this time the fourth frame is identical to the input video, and no purpose would be served by summing the incoming video to itself.

The requirement for replay of video is dependent only on the number of frames desired to be summed. If two frames are to be summed, the requirement is for the original incoming video to be summed with one recorded frame only. If three frames are to be summed, the requirement is for the incoming video to be summed with the preceding two recorded frames. If four frames are to summed, the requirement is for the incoming video to be summed with the preceding three recorded frames. The replay command signals $R_1$–$R_4$ are determined by the position of switch 44. The logic network 42 contains AND and OR gates arranged to provide the required replay command signals in accordance with the following logic equations:

R1 = (W7 + W8)2 + (W5+W6+W7+W8)3 + (W3+W4+W5+W6+W7+W8)4

R2 = (W1+W2)2 + (W7+W8+W1+W2)3 + (W5+W6+W7+W8+W1+W2)4

R3 = (W3+W4)2 + (W1+W2+W3+W4)3 + (W7+W8+W1+W2+W3+W4)4

R4 = (W5+W6)2 + (W3+W4+W5+W6)3 + (W1+W2+W3+W4+W5+W6)4 where,

W1 = record head one

R1 = replay frame one

2 = sum two frames mode

While this invention has been described with specific reference to a preferred embodiment, modifications will readily suggest themselves thereto without departing from the scope of the following claims.

What is claimed is:

1. A noise-reducing system for reducing noise from color television video signals arriving on an input line, said system comprising:

separator means coupled to the input line for separating the video signals into their constituent luminance and chrominance components;

a television disc recorder for recording the luminance component consecutively on a plurality of channels;

a summing amplifier coupled to the output of each channel and adapted to receive said luminance component directly from said separator means;

means coupling said chrominance component from said separator to said summing amplifier;

a sync generator means coupled to said input line for generating synchronizing signals for said noise-reducing system;

a controller means coupled to the output of said sync generator for generating (1) disc-control command signals to said disc recorder and (2) weighting command signals to said summing amplifier whereby said summing smplifier combines the luminance component of each incoming frame with the luminance component of at least one preceding recorded frames to obtain an averaged luminance signal of a signal amplitude equivalent to that of the original input video signal and said summing amplifier being responsive to said controller means for combining the chrominance component with said averaged luminance signal to obtain a noise-reduced color video signal.

2. The system of claim 1 and further including a processing amplifier means for receiving the noise reduced color video signal and restoring the synchronizing signals thereto to thereby provide a fully reconstructed video signal.

3. A noise reducing system for reducing noise from television video signals including a succession of frames arriving on an input line, said system comprising:

separator means coupled to said input line for separating the video signals into their constituent luminance and chrominance components;

storage-and-reproducing means having at least two storage channels for consecutively storing the luminance components of incoming video frames from said input line, and selective combining means adapted to receive the outputs of said storage-and-reproducing means to weightingly combine the luminance component of each arriving video frame with the luminance component of one or more preceding recorded frame as selected whereby the resultant averaged combined luminance component signal has a higher signal-to-noise ratio compared to the signal-to-noise ratio of the individual frames, and said combining means recombining the separated chrominance component with the averaged luminance component signal to obtain a noise-reduced television signal.

* * * * *